United States Patent [19]

Iwata et al.

[11] 4,284,336
[45] Aug. 18, 1981

[54] AUTOMATIC FOCUSING CAMERA

[75] Inventors: Hiroshi Iwata, Nara; Wataru Hasegawa, Sakai, both of Japan

[73] Assignee: West Electric Co., Ltd., Osaka, Japan

[21] Appl. No.: 86,073

[22] Filed: Oct. 18, 1979

[30] Foreign Application Priority Data

Oct. 26, 1978 [JP] Japan .................. 53/132169

[51] Int. Cl.³ .................. G03B 3/10; G03B 17/38
[52] U.S. Cl. .................. 354/25; 354/195; 354/234; 354/266
[58] Field of Search .................. 354/25, 195, 234, 235, 354/260, 196–201, 267, 268

[56] References Cited

U.S. PATENT DOCUMENTS 3,713,371  1/1973  Kurshara et al. .................. 354/25

Primary Examiner—L. T. Hix
Assistant Examiner—William B. Perkey
Attorney, Agent, or Firm—Burgess, Ryan and Wayne

[57] ABSTRACT

An automatic focusing camera wherein after the distance to object has been measured automatically by an ultrasonic or optical distance measuring means, a photographic lens is automatically shifted from the minimum focusing distance position to the infinity position and a shutter is released automatically without stopping the lens when the lens is shifted to such a position where the image of an object is in sharp focus.

3 Claims, 10 Drawing Figures

AUTOMATIC FOCUSING CAMERA

BACKGROUND OF THE INVENTION

The present invention relates to an automatic focusing camera.

With the conventional automatic focusing cameras with an ultrasonic or optical distance measuring device, in response to a reading of the distance to object, a photographic lens is shifted to a focusing position by a spring and ratchet mechanism or by a servomotor and then a shutter is released. Therefore they are complex in construction and control devices are very expensive.

In the automatic focusing cameras of the type using the spring and ratchet mechanism, the spring is used to shift the photographic lens and the ratchet mechanism is used to stop the lens at a focusing position. In addition, a power source for driving the ratchet mechanism and a power supply control circuit for controlling the power supply to the ratchet mechanism are needed. As a result, the constructions are very complex. In addition, it is very difficult to attain the correct timing for causing the ratchet mechanism to arrest the lens, thereby stopping it at a focusing position. Furthermore, the component parts must be fabricated within extremely accurate dimensional tolerances. Moreover due to the wear of mutually engaging parts of the lens and ratchet mechanism, the lens cannot be stopped at a correct focusing position.

With the automatic focusing cameras of the type using a servomotor for shifting the lens, the servomotors themselves are very expensive and highly advanced technologies are required to design and construct the circuits for controlling the servomotor. As a result, it becomes difficult to supply at inexpensive costs the automatic focusing cameras for general users.

SUMMARY OF THE INVENTION

In view of the above, the primary object of the present invention is to provide an automatic focusing camera wherein after the distance to object has been measured by an ultrasonic or optical distance measuring means, a photographic lens is automatically shifted from the minimum focusing distance position to the infinity position and a shutter is released automatically without stopping the lens when the lens reaches the position at which the image of an object is in sharp focus.

As with the prior art automatic focusing cameras, an ultrasonic or optical distance measuring means is used to measure the distance to object, but the present invention is featured in that when the lens reaches the position at which the image of an object is in sharp focus, the shutter is automatically released without stopping the lens. As a result, the electronic circuitry and mechanical construction may be remarkably simplified so that the fabrication may be much facilitated at less cost. Therefore the present invention may provide an automatic camera at very inexpensive cost.

Another object of the present invention is to provide an automatic focusing camera wherein the shutter speeds and the aperture, shift speed and focal length of the lens are so correlated that even when the shutter is released without stopping the lens at a focusing position a picture with high quality may be obtained.

BRIEF DESCRIPTION OF THE DRAWINGS

Same reference numerals are used to designate similar or identical parts throughout the figures.

DESCRIPTION OF THE PREFERRED EMBODIMENTS

Figure 1:
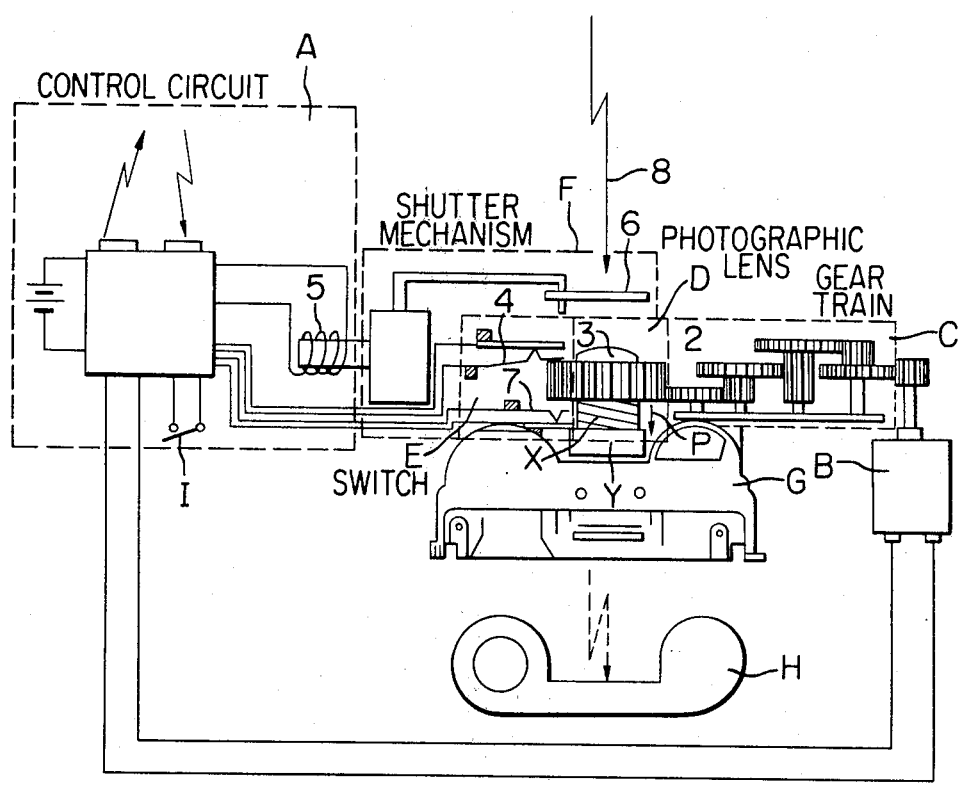
FIG. 1 is a top view of a first embodiment of an automatic focusing camera in accordance with the present invention.
Figure 2A:
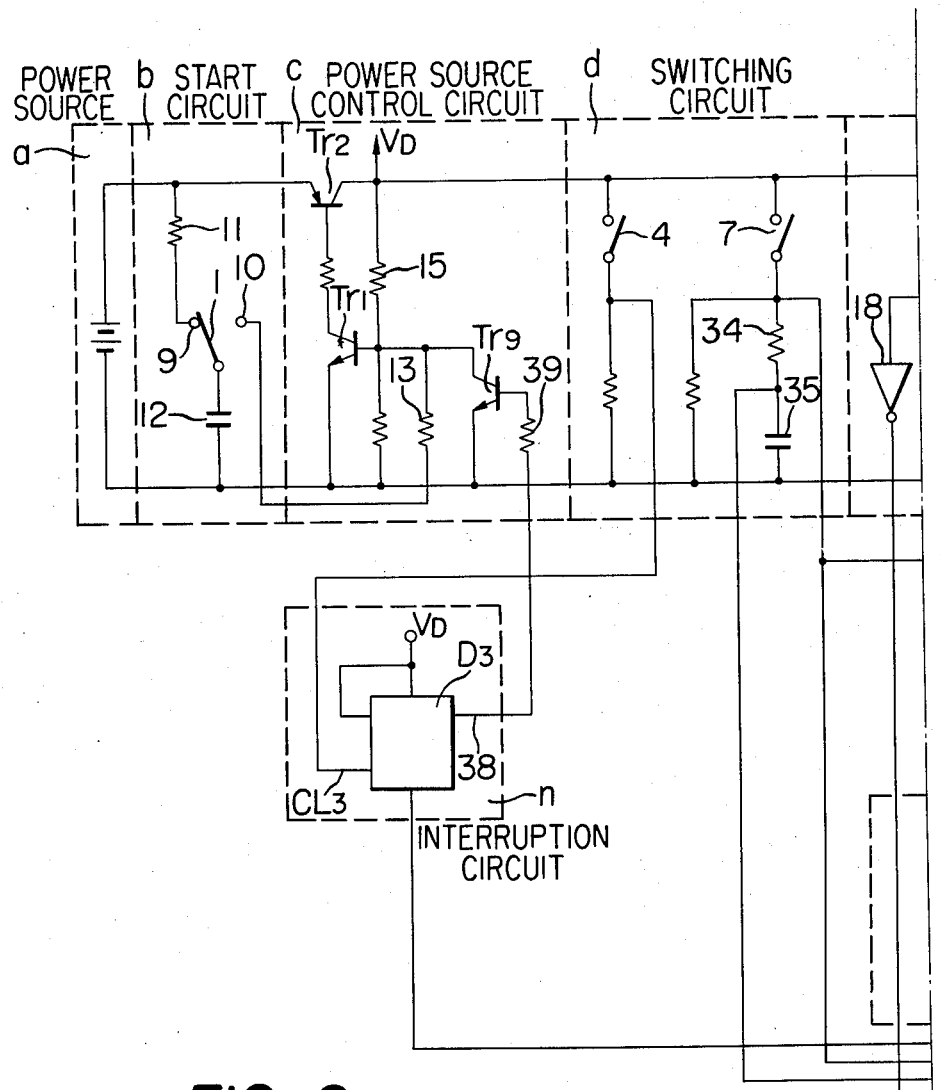
FIGS. 2, 2A, 2B and 2C are a diagram of an electronic circuit thereof.
Figure 2:
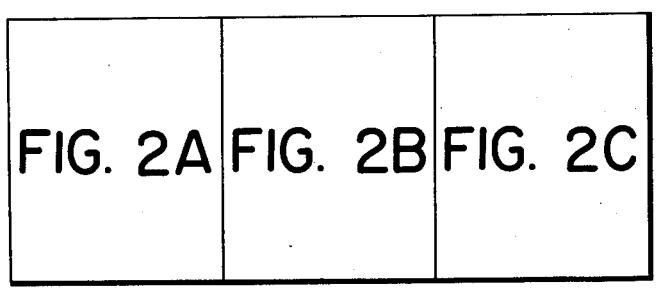
Figure 2B:
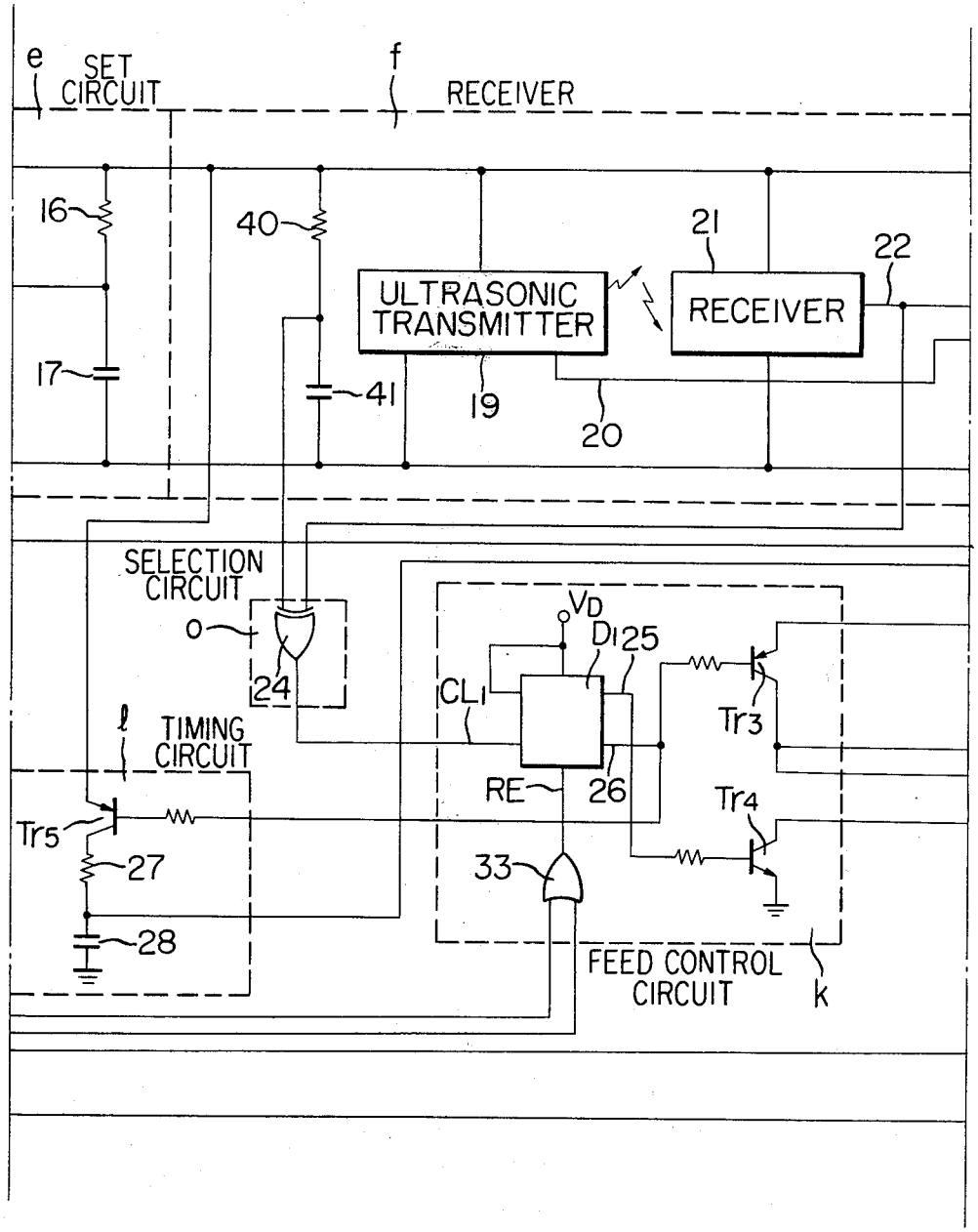
Figure 2C:
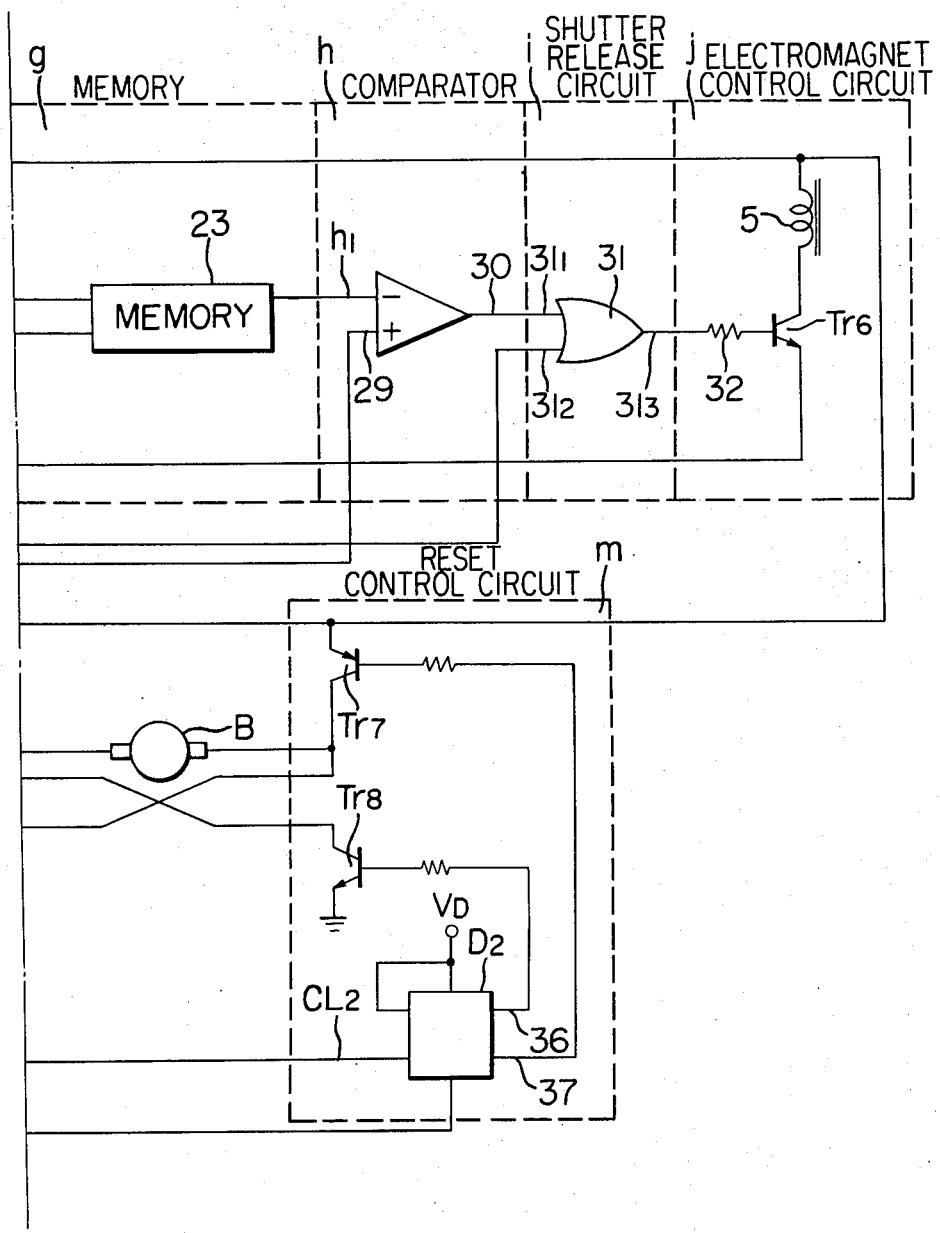

First Embodiment, FIGS. 1 and 2

Referring to FIG. 1, a first embodiment of an automatic focusing camera in accordance with the present invention comprises, in general, a control circuit A such as an ultrasonic transmitter-receiver, an electric motor B, a gear train C, a photographic lens D, a switch E, a shutter mechanism F, a film case holder G and a film case H.

When a shutter release button (not shown) is depressed, a contact 1 in the control circuit A is closed so that the control circuit A is activated to measure a distance to an object. After the measurement of the distance, the motor B is rotated so that a gear 2 on the lens assembly D is rotated through the gear train C. The lens assembly D consists of the gear 2, a lens 3 and an externally threaded gear X on a lens mount. The gear X is made into engagement with an internally threaded gear Y of the film case holder G. Upon rotation of the motor 3, the lens assembly D is rotated and displaced inwardly or retracted in the direction indicated by the arrow P from the minimum focusing distance or range position shown in FIG. 1 to the infinity position.

As the lens assembly D is retracted in the direction P, the normally closed contact 4 of the switch E is opened as will be described in more detail with reference to FIG. 2.

The velocity of the lens assembly D or lens 3 is predetermined. When the electrical signal representative of the displacement of the lens 3 coincides with the electrical signal representative of the distance to an object an electromagnet 5 is energized in response to the signal from the control circuit A so that a shutter 6 is released and consequently the light rays 8 from an object fall on the film in the case H.

Since the motor B is kept energized, the lens 3 keeps moving toward the infinity position in the direction indicated by the arrow P and closes the normally open contact 7 so that the motor B is reversed in response to the signal from the control circuit A as will be described in detail with reference to FIG. 2. The lens 3 is displaced externally or extended in the direction opposite to the arrow P to the minimum focusing distance position shown in FIG. 1 and closes the normally closed contact 4 so that the control circuit A stops the motor B. Thus the camera is reset for the next exposure.

In general, the shutter mechanisms are so designed and constructed that when the film is wound, the shutter button is set to be depressed. Therefore, strictly speaking, the camera is reset for the next exposure means that when the shutter button is depressed, the next exposure is made.

In FIG. 2 is shown the diagram of an electric circuit of the first embodiment comprising a power source a, a start circuit b, a power source control circuit c, a switching circuit d including the switch E shown in FIG. 1, a reset circuit e, an ultrasonic transmitter and receiver f, a memory g for storing the signal representative of the distance to an object measured, a comparator h, a forced shutter release circuit i, an electromagnet control circuit j, a feed control circuit k, a timing circuit l, a reset control circuit m, an interruption circuit n and a selection circuit o. The control circuit A includes all the components described above except the switch E in the switching circuit d.

Upon depression of the shutter button (not shown), the movable contact 1 in the start circuit b, which is so biased or otherwise adapted to return its initial position, is moved away from the stationary contact 9 and made into engagement with the stationary contact 10. Then the energy stored on a capacitor 12 from the power source a through a resistor 11 is discharged as the base current to a transistor $Tr_1$ through a resistor 13 in the power source control circuit c. The transistor $Tr_1$ is enabled so that the current flows from the power source a through the emitter and base of a transistor $Tr_2$ and the collector and emitter of the transistor $Tr_1$. That is, the base current of the transistor $Tr_2$ flows so that the transistor $Tr_2$ is activated.

Then the current flows from the source a through a resistor 15 into the base of the transistor $Tr_1$ so that the transistor $Tr_1$ may be maintained conducted and consequently the transistor $Tr_2$ may be also kept enabled. As a result, the energy is kept supplied to the other circuits from the power source a.

The reset circuit e supplies the reset signal to the associated circuits through an inverter 18 for a time interval which is dependent upon the values of a resistor 16 and a capacitor 17.

When the energy is supplied from the power source a in the manner described above, an ultrasonic transmitter 19 in the ultrasonic transmitter-receiver f transmits the ultrasonic waves toward an object and simultaneously the signal representative of the activation or operation of the transmitter 19 is transmitted from a terminal 20 to the memory g which in turn starts measuring the distance to an object.

The operations of the camera are different depending upon whether an object to be photographed is within or beyond measurable range. That is, when an object is within the measurable range, the ultrasonic waves transmitted are reflected from the object and received by a receiver 21, but when an object is beyond the measurable range, the ultrasonic waves reflected back from the object cannot be received.

First, the mode of operation when an object is within the measurable range will be described. The ultrasonic waves transmitted from the transmitter 19 are reflected back from the object and received by the receiver 21. The received signal is applied from a terminal 22 to the memory g which in turn stops measuring the distance to the object and stores the distance to object. The voltage representative of the distance to object is applied from a terminal of a memory 23 to the reference input terminal $h_1$ of the comparator h.

The signal from the receiver 21 is also applied as the clock signal to the clock terminal $CL_1$ of a D type flip-flop $D_1$ in the feed control circuit k through an exclusive-or circuit 24 to be referred to as EXOR circuit in the selection circuit o.

As a consequence, the output terminal 25 of the flip-flop $D_1$ rises to a high level from a low level while the negative output terminal 26 drops from a high level to a low level. Then transistors $Tr_3$ and $Tr_4$ are activated so that the current flows from the power source a through the transistors $Tr_2$ and $Tr_3$, the motor B and the transistor $Tr_4$ so that the motor B is driven and the lens 3 is retracted to open the normally closed contact 4 in the switching circuit d as described above with reference to FIG. 1.

Since the terminal 26 drops to a low level, a transistor $Tr_5$ in the timing circuit l is enabled so that a timing capacitor 28 is charged through the transistor $Tr_5$ and a resistor 27. The timing capacitor 28 is connected to the comparison terminal 29 of the comparator h so that when the voltage across the timing capacitor 28 reaches the level of the voltage signal which is applied to the reference input terminal $h_1$ from the memory g and represents the distance to object, a high level output is derived from the output terminal 30 of the comparator h.

One input terminal $31_1$ of an OR gate 31 in the forced shutter release circuit i is connected to the output terminal 30 of the comparator h while the other input terminal $31_2$ is connected to the power source control circuit c through the normally open contact 7. Therefore when the object is within the measurable range; that is, when the normally open contact 7 is not closed during the shift of the lens 3, a high-level output signal is derived from the output terminal $31_3$ of OR gate 31 in response to the high-level input signal from the comparator 30 to the input terminal $31_1$ and is applied to the base of a transistor $Tr_6$ through a resistor 32 in the electromagnet control circuit j. As a result, the transistor $Tr_6$ remains conducted so that the electromagnet 5 is energized and the shutter is released as described elsewhere with reference to FIG. 1.

As described above, according to the present invention, the time required for shifting the lens 3 by the motor B which rotates at a predetermined speed is correlated with the distance to object which is measured. As a result, in a strict sense, the timing for shutter release will not correctly coincide with the timing when the image of an object is sharply focused upon the film. However, the error, or the difference between the two is negligible. For instance, assume that the feed of the lens be 1 cm/sec and a shutter speed, 1/250 sec. Then, during about 6 m/sec of shutter release, the lens is shifted by about 0.06 mm. But out-of-focus due to such a very small shift may be negligible. Thus as compared with the conventional automatic focusing cameras provided with means for stopping the lens, the automatic focusing camera in accordance with the present invention may be made very simple in construction and fabricated at low cost.

The shift or retract of the lens continues even after the exposure until the lens reaches the infinity position. The normally open contact 7 in the switching circuit d is closed so that the voltage of the power source a is applied to the reset terminal RE of the flip-flop $D_1$ through an OR gate 33, whereby the latter is reset and the transistors $Tr_3$ and $Tr_4$ are disabled. As a consequence, the motor B is stopped.

When the normally open contact 7 is closed, the voltage across a capacitor 35 reaches a predetermined level after a time which is dependent upon the values of a resistor 34 and the capacitor 35. Then the clock signal is applied to the clock terminal $CL_2$ of a D-type flip-flop $D_2$ in the return control circuit m so that the output terminal 36 rises to a high level while the negative output terminal 37 drops to a low level. As a result, transistors $Tr_7$ and $Tr_8$ are enabled so that the motor B is driven in the opposite direction so as to return the lens 3 to its initial position.

When the lens 3 has been returned to its initial position, the normally closed contact 4 is closed again so that the voltage of the power source a is applied as the clock signal to the clock terminal $CL_3$ of a D-type flip-flop $D_3$ in the interruption circuit n. Then the output terminal 38 of the flip-flop $D_3$ rises to a high level which is applied through a resistor 39 to the base of a transistor $Tr_9$ so that the transistor $Tr_9$ is enabled. The base potential of the transistor $Tr_1$ turns low and the transistor $Tr_1$ is disabled. As a consequence, the transistor $Tr_2$ is also disabled so that the power supply to all circuits including the motor B is interrupted. Thus one exposure operation is completed.

Next the mode of operation will be described when an object is beyond the measurable range. In this case, the ultrasonic waves transmitted by the transmitter 19 and reflected back from the object will not be received by the receiver 21. As a result no signal is applied to the feed control circuit k so that the motor B is not driven and the shutter is not released. Therefore according to the present invention when the receiver 21 receives no ultrasonic waves reflected back from an object, the lens is forced to retract and the shutter is released when the lens 3 reaches the infinity position. To this end, the transmitter-receiver circuit f includes a resistor 40 and a capacitor 41. When the voltage across the capacitor 41 reaches a predetermined level after predetermined time which is dependent upon the values of the resistor 40 and capacitor 41, the clock signal is applied to the clock terminal $CL_1$ of the D-type flip-flop $D_1$ through EXOR gate 24 in the selection circuit o. Then the flip-flop $D_1$ operates in the same manner as when the signal is applied from the receiver 21. Therefore the motor B is driven so that the lens 3 is retracted to the infinity position in the manner described elsewhere.

Meanwhile no signal is applied to the reference input terminal $h_1$ of the comparator 30. That is, the input terminal $h_1$ remains at a high level which represents that an object is at infinity. The voltage across the capacitor 28 will not exceed the voltage applied to the terminal $h_1$. As a result, no high-level output signal is derived from the output terminal 30 of the comparator h so that the shutter will not be released.

When the lens 3 reaches the infinity position and the normally open contact 7 is closed so that the flip-flop $D_1$ is reset, the high-level signal is applied to the other input terminal $31_2$ of OR gate 31. As a result, the output terminal $31_3$ of OR gate 31 rises to a high level so that the transistor $Tr_6$ is enabled to energize the electromagnet 5, whereby the shutter is released.

When an object is within the measurable range, the high-level signal is also applied to the other input terminal $31_2$ of OR gate 31 when the lens 3 reaches the infinity position, but the output terminal $31_3$ has already risen to a high level before the lens 3 reaches the infinity position. Therefore the electromagnet 5 remains energized. The shutter is released when the electromagnet 5 is energized.

Even when an object is within the measurable range, the signal from the capacitor 41 is applied to one of the input terminals of EXOR gate 24 in the selection circuit o, but the signal from the receiver 21 has been already applied to the other input terminal so that the output terminal drops to a low level. However, D-type flip-flop $D_1$ will not respond to the trailing edge of the clock pulse applied to the terminal $CL_1$.

Figure 3A:
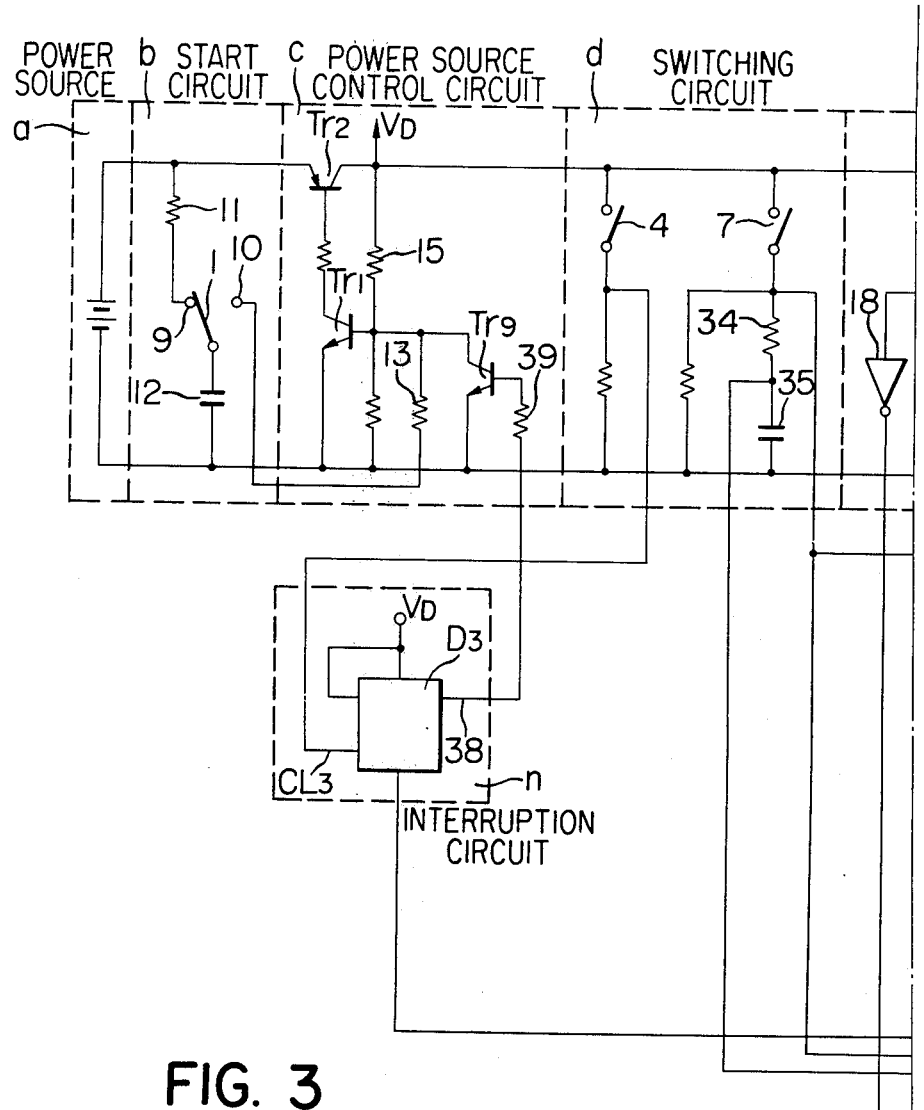
FIGS. 3, 3A, 3B and 3C are a diagram of an electronic circuit of a second embodiment of the present invention.
Figure 3:
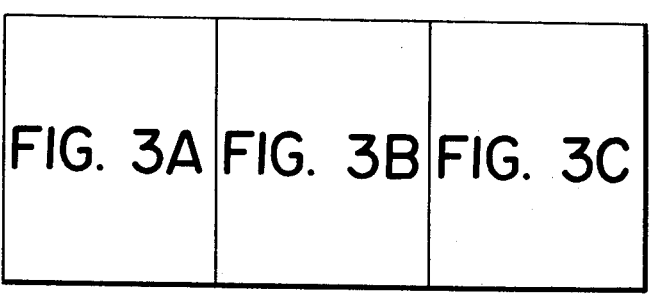
Figure 3B:
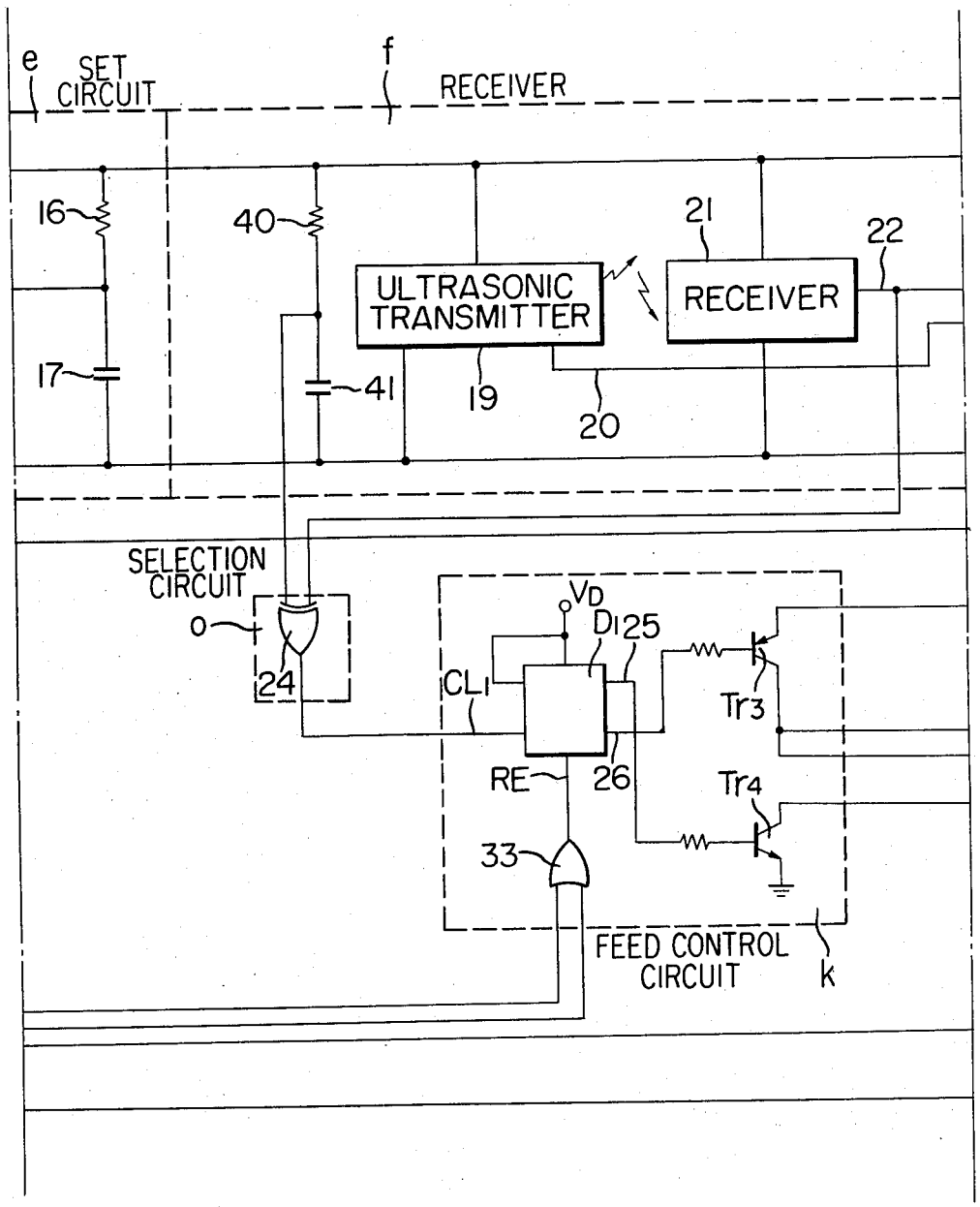
Figure 3C:
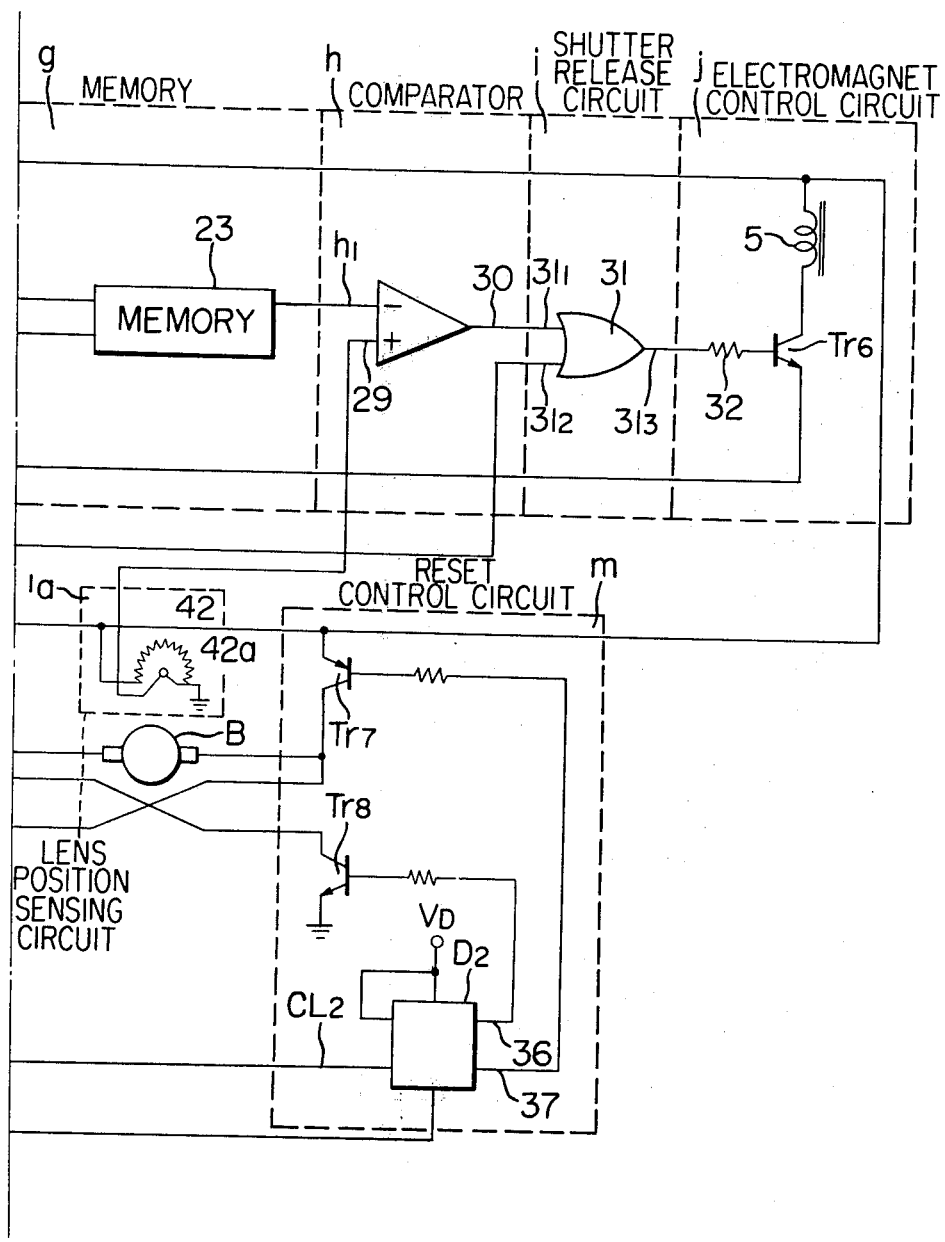

Second embodiment, FIG. 3

In FIG. 3 is shown the diagram of an electric circuit of a second embodiment of the present invention which is substantially similar in construction to the circuit shown in FIG. 2 except that instead of the timing circuit l, a lens position sensing circuit la is provided so that the position of the lens 3 may be directly sensed instead of detecting it in terms of time.

The lens position sensing circuit la comprises a variable resistor 42 with its wiper arm 42a being rotated in unison with the lens 3 so that the resistance of the variable resistor 42 changes depending upon the position of the lens 3. The wiper arm 42a is connected to the input terminal 29 of the comparator h and both ends of the resistor 42 are connected to the power source a as shown.

When the motor B is driven to shift the lens 3 toward the infinity position in the direction indicated by the arrow P as described elsewhere with reference to FIGS. 1 and 2, the wiper arm 42a is also rotated so that the potential at the input terminal 29 of the comparator h is increased. When the potential at the input terminal 29 reaches the level of the voltage applied to the input terminal $h_1$, the electromagnet 5 is energized so that the shutter is released in the manner described elsewhere with reference to FIG. 2.

The second embodiment is advantageous over the first embodiment in that since the position of the lens 3 is directly detected, the shutter may be released correctly at the instant when the image of an object is focused sharply.

Figure 4:
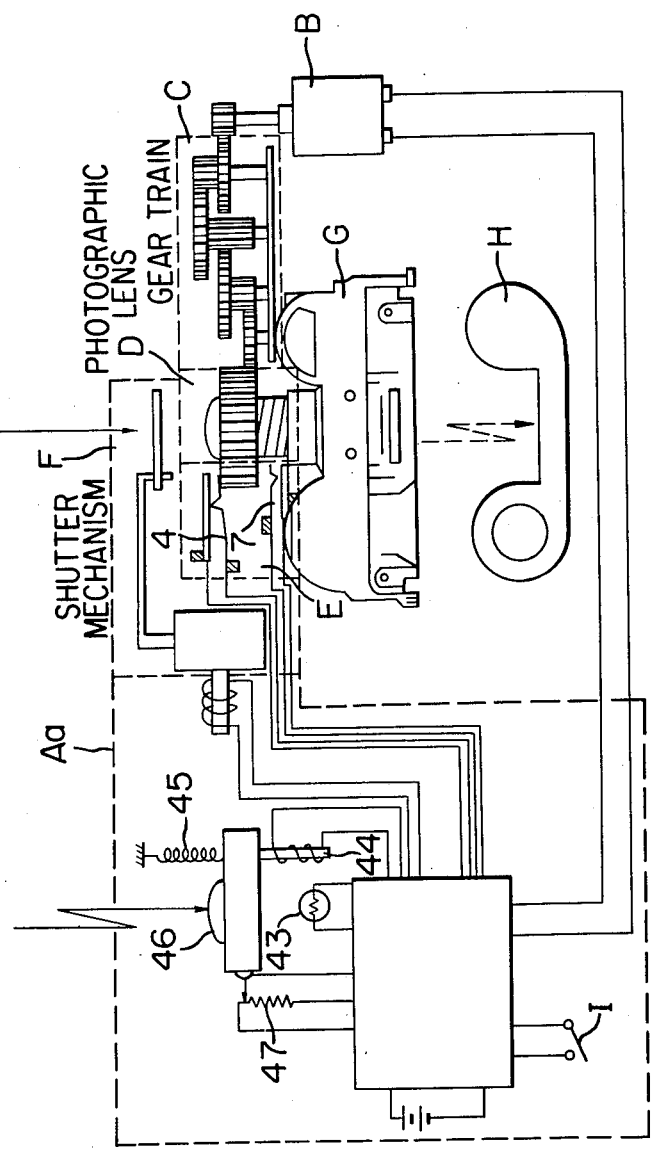
FIG. 4 is a schematic top view of a third embodiment of an automatic focusing camera in accordance with the present invention.

Third Embodiment, FIG. 4

In the first and second embodiments, the distance to object is measured by using the ultrasonic waves, but in the third embodiment shown in FIG. 4, an optical means is used to measure the distance to object. That is, the so-called "out-of-focus image detection" type focusing system is employed as the control circuit A. With this system, the resistance of a photoelectric element 43 reaches extreme value when the image of an object is focused sharply. Upon depression of the shutter button (not shown), the switch I is closed so that an electromagnet 44 is energized to cause an auxiliary lens 46 to retract itself from the minimum focusing distance position to the infinity position against a bias spring 45.

When the image of an object is sharply focused on the film, the photoelectric element 43 exhibits a resistance of the extreme value. The output voltage of the potentiometer 47, whose wiper contact is mounted on the auxiliary lens 46, when the photoelectric element 43 exhibits a resistance of the extreme value is stored in a memory and applied to the terminal $h_1$ of the comparator h shown in FIG. 2 or 3 as the reference input voltage. Then as the motor B is driven, the shutter is released in the manner described with reference to FIG. 2.

In summary, according to the present invention the ultrasonic or optical means is used to measure the distance to object and the shutter is released while the lens is retracted from the minimum focusing distance position toward the infinity position at the instant when the image of an object is focused sharply. Therefore the present invention may provide an automatic focusing camera which is very simple in construction and may be fabricated at less cost.

What is claimed is:

1. An automatic focusing camera capable of automatically measuring the distance to an object and focusing the image of said object, characterized by the provision of
    (a) a power supply control means for controlling the power supply from a power source,
    (b) a distance measuring means for measuring the distance to said object,
    (c) a lens shift means for continuously shifting a lens between the minimum focusing distance position and the infinity position,
    (d) a lens position sensing means for sensing the position of said lens, and
    (e) a shutter control means responsive to both the signals from said distance measuring means and said lens position sensing means for controlling the release of a shutter, whereby said shutter may be released while said lens is being shifted.

2. An automatic focusing camera as set forth in claim 1 further characterized in that
    said distance measuring means includes an ultrasonic or optical means which is actuated by the energy supplied from said power source through said power supply control means which is actuated in response to the depression of a shutter button, and said power supply control means is deactivated or disabled when said lens is returned to its initial position.

3. An automatic focusing camera as set forth in claim 1 further characterized in that
    said shutter control means has an electromagnet which opens and closes the shutter,
    a voltage whose level represents the distance to object is stored in a memory means,
    the level of said voltage stored in said memory means is compared with the level of the output signal from said lens position sensing means so as to control said electromagnet, and there is provided a means for forcibly energizing said electromagnet when said shutter control means has not operated within a predetermined time interval.

* * * * *